Figure 1:
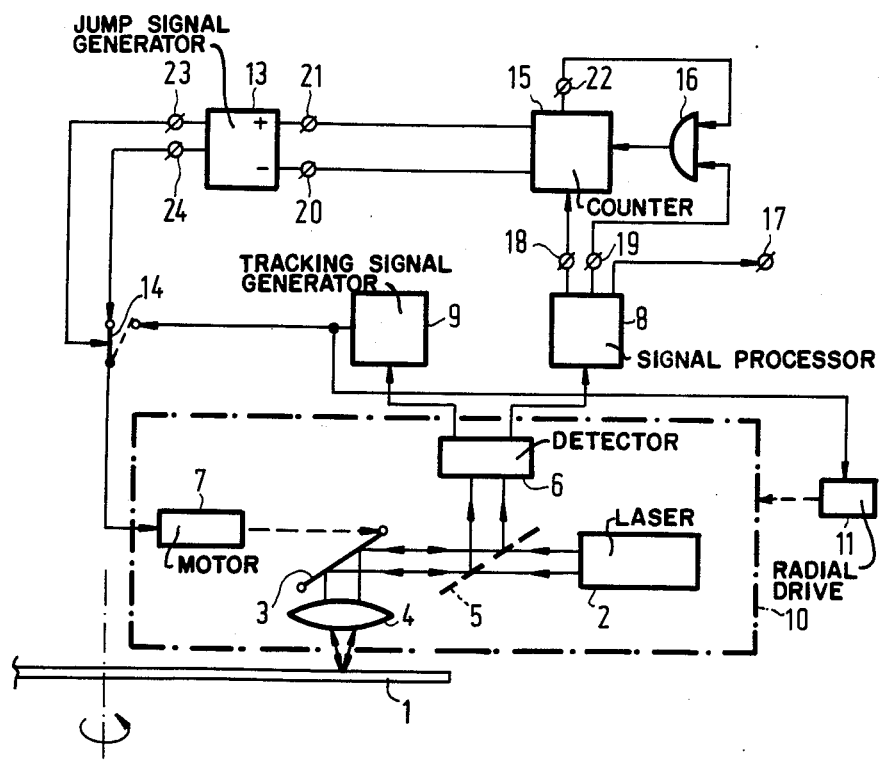

United States Patent [19]

van Lier

[11] Patent Number: 4,677,500
[45] Date of Patent: Jun. 30, 1987

[54] SYSTEM FOR PLAYING BACK A FILM RECORDED AS A VIDEO SIGNAL ON A DISC-SHAPED RECORD CARRIER

[75] Inventor: Johannes C. van Lier, Eindhoven, Netherlands

[73] Assignee: U.S. Philips Corporation, New York, N.Y.

[21] Appl. No.: 698,998

[22] Filed: Feb. 7, 1985

[30] Foreign Application Priority Data

Feb. 8, 1984 [NL] Netherlands ............. 8400391

[51] Int. Cl.⁴ .................................... G11B 7/00
[52] U.S. Cl. ........................... 358/342; 358/214
[58] Field of Search ............... 358/342, 314, 214; 360/10.1, 10.2, 35.1

[56] References Cited

U.S. PATENT DOCUMENTS 4,417,285  11/1983  Mes ........................... 358/342

Primary Examiner—Robert L. Richardson
Attorney, Agent, or Firm—Robert T. Mayer; Algy Tamoshunas

[57] ABSTRACT

In order to enable film frames of a film standard in which the number of film frames per second differs from the number of video pictures per second of the television standard in use with a gain of playing time, to allow still-picture operation on every turn, and to enable the picture numbers to be inserted on one radius, it is proposed to record one film frame as two video fields in every turn of the disc and to bring the number of video fields reproduced per second into conformity with the specified number of film frames per second by means of a pattern of forward and/or backward jumps effected during reproduction from the disc.

12 Claims, 3 Drawing Figures

SYSTEM FOR PLAYING BACK A FILM RECORDED AS A VIDEO SIGNAL ON A DISC-SHAPED RECORD CARRIER

The invention relates to a system for playing back a programme of consecutive film frames recorded on a disc-shaped record carrier. The record carrier is provided with a substantially spiral-shaped or concentric ring-shaped information track in which the programme has been recorded as a video signal in a sequence of two fields in every turn of the track, requiring n film frames per unit of time to be reproduced, in order to achieve reproduction with the original frame speed, the nominal playback speed of the record carrier being m video pictures of two fields per unit of time, with m>n, which read apparatus comprises means for moving the scanning point of the record carrier forwards or backwards in a substantially radial direction over a distance corresponding to the radial displacement over at least one revolution.

The invention also relates to a read apparatus and a record carrier for use in a system in accordance with the invention.

Such a system is described in Netherlands Patent Application No. 7702874 corresponding to U.S. Pat. No. 4,417,285.

The record carriers are primarily intended to be provided with a programme by the factory and thus to be made available to the consumer as prerecorded record carriers. The most likely programme material for this type of prerecorded record carriers is film because this is available in large quantities and in a wide repertory. If a film programme is to be used for the manufacture of record carriers destined for, for example, the American market, a complication results from the difference between the standards for the reproduction of film images and those for the reproduction of television pictures. The standards used for film require imply that, for example, 24 film frames per second are recorded and reproduced. In order to convert such a film programme into a video signal which is suitable for recording on said disc-shaped record carriers, each film frame is scanned in accordance with a pattern of interlaced fields. However, in accordance with the U.S. television standard, 30 pictures per second must be reproduced, so that it is not possible to transform one film frame into one television picture because then the playback speed of the recorded programme would not be correct. The necessary adaptation can be obtained by programming the film scanner so that consecutive film frames are alternately converted into a set of two fields and a set of three fields. This means that two film frames are converted into five fields or four film frames into 10 fields or 5 television pictures, which corresponds to a 24/30 conversion from the film standard into the television standard.

In the still-picture mode, the scanning spot is moved back radially by one track pitch after every revolution of the record carrier with the aid of deflection means, so that continually the same turn of the spiral track is scanned. Since exactly two fields are recorded in one turn of the track, which fields together constitute an interlaced television image, one specific picture of the recorded television signal is reproduced continuously in this still-picture mode. If a read apparatus for disc-shaped record carriers operates in the still picture mode, it has been found that the reproduction quality is not always satisfactory in the case of a television programme which is recorded in the manner described above. Often the television picture reproduced in the still-picture mode exhibits blurring and in the case of certain programmes it may even be completely unacceptable. This is because alternately two and three fields per film frame are recorded, so that there are turns of the information track containing two fields which belong to different film frames and which are reproduced alternately in the still-picture mode.

Therefore it has been proposed in the above Netherlands Patent Application No. 7702874 to assign a picture number to one specific field of a set of two fields corresponding to the same film frame and to construct the read apparatus in such a manner that only the two fields identified by the picture number can be reproduced in the still-picture mode. As a result of this, a turn containing two fields of different pictures cannot be reproduced in the still-picture mode. However, as a result of this, the picture numbers of the consecutive pictures on the disc will be situated on two radii of the turn which are spaced from each other by 180°. This complicates jumps over several pictures or search operations for a picture number, so that these operations cannot be performed instantaneously because fast actions are confined to about one radius. This may be solved by recording the film frames in the sequence of two, three, three and two fields and by inserting the picture numbers in the first, the third, the seventh and the ninth, or the second, the fourth, the eighth and the tenth field of that cycle of ten fields corresponding to four film frames.

The invention aims at providing a system of the type specified in the opening paragraph and a read apparatus and a record carrier for use in such a system, which allows still-picture reproducing on every turn and which allows the picture numbers to be recorded in every turn and on one radius without the disadvantage of repeating picture information at the expense of the playing time.

To this end, in the system in accordance with the invention, each film frame recorded as only two consecutive fields of the video signal on a single turn of the track. During read-out the scanning point is moved backwards and/or forwards to a preceding and a following turn of a track, respectively, in conformity with a predetermined pattern, which turn is situated at a distance corresponding to at least the radial displacement over one revolution in such a way that each time consecutive film frames are reproduced as consecutive sets of at least two fields corresponding to the same film frame, with the number of film frames reproduced per unit of time being the specific number n and the number of video pictures reproduced being m.

In particular in the above situation of a film comprising 24 frames per second and a television standard of 30 pictures per second, the invention may be characterised further in that n=24 and m=30 and said pattern is such that for every cycle of four film frames two sets of two fields belonging to a different film frame and two sets of three fields belonging to a different film frame are reproduced by reproducing two of the eight recorded fields belonging to said four film frames twice every cycle in conformity with said pattern.

In another embodiment this system is characterised further in that in said cycle of four film frames, corresponding to ten reproduced fields, a backward jump over two fields is effected after every fourth and every sixth field and a forward jump over two fields is effected after every fifth field.

An alternative requiring more jumps is characterised in that in said cycle of four film frames, corresponding to ten reproduced fields, a backward jump over two fields is effected after every fourth, every sixth and every eighth field and a forward jump over two fields is effected after every fifth and every seventh field.

A read apparatus for use in the system in accordance with the invention is characterised by means for generating such a predetermined pattern of forward or backward jumps that consecutive film frames are reproduced as consecutive sets of at least two fields belonging to the same film frame so that the number of film frames reproduced per unit of time is equal to the specified number n and the number of video pictures reproduced is m.

This apparatus may be characterised further in that the means for moving the scanning point in conformity with a predetermined pattern comprise counting means for counting the fields reproduced and generating said pattern as a function of the count of said counting means.

This read apparatus may be characterised further in that the means for moving the scanning point in conformity with a predetermined pattern are constructed so that within said cycle of four film frames, corresponding to ten reproduced fields, a backward jump over two fields is effected after every fourth and every sixth field and a forward jump over two fields is effected after every fifth field.

Alternatively, this read apparatus may be characterised in that the means for moving the scanning point in conformity with a predetermined pattern are constructed so that within said cycle of four film frames, corresponding to ten reproduced fields, a backward jump over two fields is effected after every fourth, every sixth and every eighth field and a forward jump over two fields is effected after every fifth and every seventh field.

The record carrier for use in the system in accordance with the invention may be characterised in that only two consecutive fields of each frame are recorded.

Figure 2:
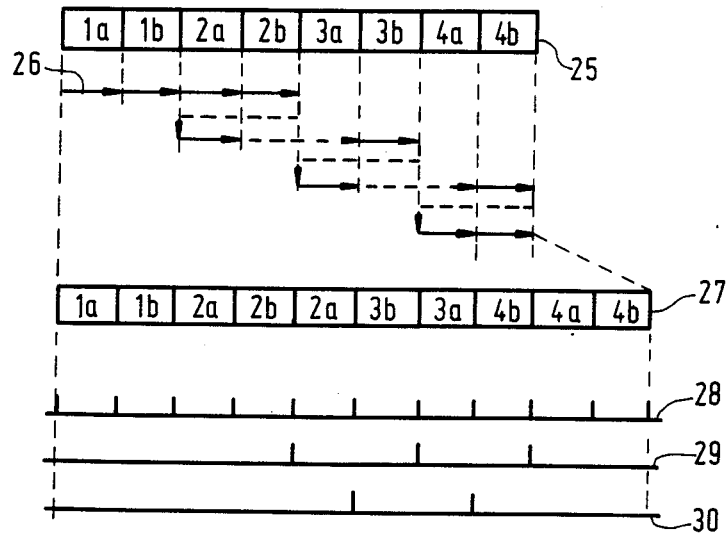
Figure 3:
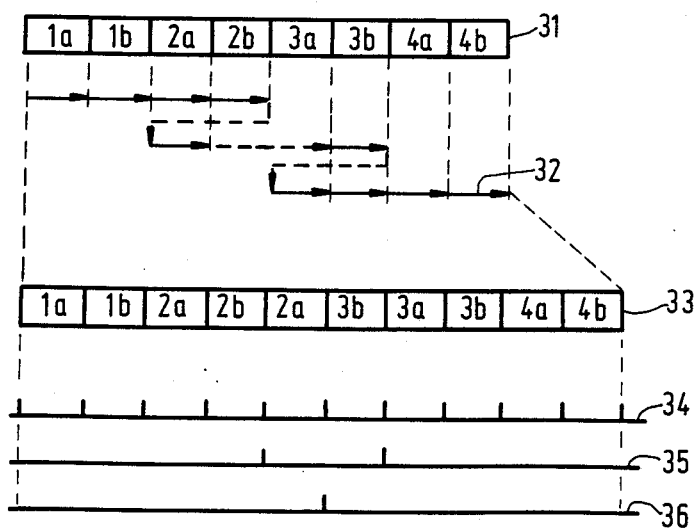

The invention will now be described in more detail, by way of example, with reference to the drawings, in which FIG. 1 shows a system in accordance with the invention, FIG. 2 is a diagram to explain the operation of the system in accordance with the invention, and FIG. 3 is a diagram to explain the operation of an alternative to the system described with reference to FIG. 2.

FIG. 1 shows an apparatus for reading a rotating optically readable record carrier 1. Reading is effected by projecting a light beam emitted by a laser 2 onto said record carrier via a pivoted mirror 3 and an objective 4. The beam reflected by the record carrier is projected onto a detector 6 by a semi-transparent mirror 5. In particular, the laser beam comprises one main beam and two subbeams and the detector 6 comprises 3 subdetectors so that by means of a tracking-error signal generator 9, a signal can be obtained which is a measure of the position of the point of incidence of the laser beam relative to the information tracks on the record carrier 1. By means of this signal, the position of the point of incidence is controlled by moving the entire optical system 10 in a radial direction by a mechanism 11, shown symbolically, and by tilting the mirror 3 by means of a motor 7, so that the point of incidence of the beam can be moved over a number of tracks in a fast and accurate manner. This is described comprehensively in inter alia the magazine Philips Technical Review, Vol. 33, 1973, no. 7, pages 186–189, U.S. Pat. No. 4,037,252, and German Offeniegungsschrift No. 31.21.013, which publications are incorporated herein by reference.

The signal obtained by means of the detector 6 is applied to a processing circuit 8 on whose output 17 the recovered video signal is available.

Further, the apparatus comprises a jump-signal generator 13 which under command of signals on its inputs 20 and 21, respectively, generates a jump signal in order to move the spot formed by the read beam forwards or backwards over one turn of the track. This jump signal on output 24 is applied to the motor 7 via a switch 14. The jump-signal generator 13 actuates switch 14 which interrupts the connection between the tracking-error generator 9 and the motor 7, so that the motor 7 is controlled by said jump-signal generator 13 until a jump has been completed.

In a manner known per se the tracking-signal generator 9 supplies a control signal to the drive motor 7 via switch 14 to keep the laser beam centred on the track to be followed between jumps.

It often happens that the picture material is available in the form of films, which gives rise to problems when transfering films onto video discs because of the different standards. The standard mainly used for films requires inter alia that 24 film frames per second are recorded and reproduced. In order to convert such a film into a video signal which is suitable for recording on a video disc, each film frame is scanned in accordance with a pattern of interlaced fields. However, when using the U.S. television standard, 30 pictures per second must be reproduced so that it is not possible to transform one film frame into one television picture because then the playback speed of the recorded programme would not be correct. The necessary adaptation can be obtained in known manner by programming the film scanner in such a way that consecutive film frames are alternately converted into a set of two fields and a set of three fields. This means that two film frames are converted into five fields or four film frames are converted into 10 fields or 5 television pictures, which corresponds to a 24/30 conversion from the film standard to the television standard. Thus, in the case of video discs containing one video picture (two fields) per revolution, alternately two and three fields belonging to the same film frame are recorded, so that there are turns containing two fields which stem from different film frames. In the "still-picture" mode this may give rise to an unsatisfactory still-picture. In the aforementioned U.S. Pat. No. 4,417,285, therefore, been proposed to assign a picture number to one specific field of a set of two fields belonging to the same film frame and to construct the video-disc player in such a manner that only the two fields identified by said picture number can be reproduced in the still-picture mode. As a result of this, a turn containing two fields belonging to different frames cannot be reproduced as a still-picture. However, this means that the picture numbers of the consecutive pictures on the disc will be situated on two radii of the turn which are spaced from each other, which complicates jumps over several pictures or search operations for a picture number, so that these operations cannot be effected simultaneously because rapid actions are restricted to substantially one radius. A solution to this is to record the film frames in a sequence of two, three, two fields and to insert the picture numbers in the first, the third, the seventh and the ninth or the second, the fourth, the eighth and the tenth field of said sequence of fields corresponding to four film frames.

A solution which readily enables still-pictures to be obtained on every turn and which enables the picture numbers to be inserted on one radius, which solution also has the advantage that the playing time is extended, will be described with reference to FIGS. 2 and 3. In accordance with this solution, the reproduction sequence is realized electronically with two and three fields per film frame in a specific sequence, the sequence two-three-two-three being described with reference to FIG. 2 and the sequence two-three-three-two being described with reference to FIG. 3.

In FIG. 2 a part of the developed spiral track 25 of a record carrier is shown schematically containing four consecutive film frames each comprising only two fields a and b. This corresponds to a playing time extension by a factor of 10/8 in comparison with the situation in which alternately two and three fields per film frame are recorded. The still-picture mode is now possible on every turn because each time two fields stemming from the same film frame are recorded in every turn. Moreover, all the picture numbers, at least when assigned either to all fields a or to all fields b (or both), are situated on one radius.

The line 26 represents schematically the normal playback operation, the solid line denoting "playback" and the broken line denoting a jump (in the present example over one turn of a track of two fields). The operation starts with the reproduction of the first four fields 1a, 1b, 2a and 2b followed by a backward jump. Subsequently, field 2a is reproduced again, followed by a forward jump after which field 3b is reproduced. This is followed by a backward jump, after which field 3a is reproduced, followed by a forward jump. Subsequently, field 4b is reproduced upon which, after a backward jump, the cycle is completed with the reproduction of fields 4a and 4b. The reference numeral 27 denotes the field sequence actually reproduced in FIG. 2. Thus, ten fields for every four film frames are reproduced in a sequence two-three-two-three and alternately a field a and a field b is reproduced, so that correct interlace is maintained. In the apparatus shown in FIG. 1 this can be effected by counting with a counter 15 the field-synchronizing pulses extracted by the processing circuit 8 and supplying a signal to initiate a backward jump on every fifth, seventh and ninth pulses on input 20 of the jump-signal generator 13 and supplying a signal to initiate a forward jump upon every sixth and eighth pulses on input 21 of said jump signal generator 13. In order to maintain the correct sequence, a reset signal may be applied to said counter after every tenth field-synchronizing pulse (on output 22), preferably in synchronism with a picture pulse generated on output 19 by circuit 8, by combining said count "10" with the picture pulse via AND-gate 16. Alternatively, synchronization may be achieved by detecting every fourth picture pulse. FIG. 2 shows the signals required for this, 28 being the field-synchronizing pulses on output 18, 29 being the signal on input 20, and 30 being the signal on input 21.

FIG. 3 shows essentially the same diagram as FIG. 2, the reference numerals 31, 32, 33, 34, 35 and 36 in FIG. 3 corresponding to the reference numerals 25, 26, 27, 28, 29 and 30, respectively in FIG. 2. The difference is that a backward jump is initiated only upon every fifth and seventh field-synchronizing pulse and a forward jump upon the sixth field-synchronizing pulse, so that the reproduction sequence two-three-three-two is obtained.

The electronic standard adaptation described may also be employed in other situations, in particular to obtain a playing time extension. For example, in the case of animated film specific recurrent patterns are used within the film frames themselves in order to reduce the number of pictures per second to be actually drawn. In this case it is required only to record the mutually different film frames and to reproduce them repeatedly by electronic means, which only requires backward jumps to repeat the frames, as the case may be in conjunction with the 24-to-30 frames per second standard adaptation described in the foregoing. It is then even possible to record film frames in conformity with different standards, to identify the various frames in a picture code or index at the beginning of the disc, and to programme the player with respect to the reproduction sequence of the various frames. The counter 15 in the apparatus shown in FIG. 1 is then programmable, for example by means of a microprocessor.

Since in the reproduction method described above fields are repeated, conventional sound recording and reproduction is not possible. Compression-expansion or multiplexing techniques may then provide a solution. For example, it is possible to employ two FM sound carriers for each stereo channel, one carrier wave for the sound to be reproduced during the first reproduction of a specific field and one for the reproduction of the sound during the repeated scan of said field, in a sequence in conformity with the reproduction diagram shown in FIG. 2 or 3.

The above method always employs one forward or backward jump at a time. However, in the system in accordance with the invention it is also possible to effect recording in such a way that for a correct reproduction jumps over several turns of a track are required, in particular when a plurality of film frames have been recorded in parallel in tracks disposed between one another.

Further, the scope of the invention is not limited to the use in optical video discs. Other methods of recording may also be used.

What is claimed is:

1. A system for playing back a program of consecutive frames of a film intended to be viewed at a rate of n film frames per second, said film being recorded as a video signal on a disc-shaped record carrier, said video signal being comprised of consecutive video pictures each consisting of two video fields, which video pictures are intended to be reproduced at a rate of m video pictures per second, where m and n are integers and m is greater than n, said video signal being recorded in a plurality of circular track portions defining concentric circles or turns of a multi-turn spiral on said record corner, each frame of said film being recorded as only two consecutive video fields in a single circular track portion so that when a given circular track portion is read during playback, two consecutive video fields, representing one film frame, are reproduced during one revolution of the record carrier, said system comprising means for rotating said record carrier, reproducing means for reading said track portions during rotation of said record carrier so as to reproduce said video signal recorded on said record carrier, said system further comprising means for moving said reproducing means and said record carrier relative to each other in a substantially radial direction so as to enable said reproducing means to jump from a track portion being read to an adjacent track portion or to the beginning of the track portion that has been read in a predetermined pattern such that n film frames per second are reproduced, with consecutive film frames being reproduced as consecutive sets of either two or more than two video fields, each set representing a single film frame, and said video pictures are reproduced at said rate of m video pictures per second.

2. A system as claimed in claim 1, wherein n=24 and m=30 and said pattern is such that for every cycle of four consecutive film frames, two of said film frames of said cycle are each represented in said video signal by a set of two video fields and each of the other two film frames of said cycle is represented in said video signal by a set of three video fields.

3. A system as claimed in claim 2, wherein during reproduction of said cycle of four film frames corresponding to ten video fields in said video signal, a backward jump over two fields recorded on said record carrier is effected after every fourth and every sixth field is read and a forward jump over two fields recorded on said record carrier is effected after every fifth field is read.

4. A system as claimed in claim 2, wherein during reproduction of said cycle of four film frames corresponding to ten video fields in said video signal, a backward jump over two fields recorded on said record carrier is effected after every fourth, every sixth and every eighth field is read and a forward jump over two fields recorded on said record carrier is effected after every fifth and every seventh field is read.

5. A system as claimed in claim 1, wherein said moving means comprises counting means for counting the video fields that are read from said record carrier and means for generating said pattern as a function of the count of said counting means.

6. An apparatus as claimed in claim 5, wherein said moving means cause said reproducing means to effect a backward jump over two fields after every fourth and every sixth field is read and a forward jump over two fields after every fifth field is read during every cycle of four consecutive film frames.

7. An apparatus as claimed in claim 5, wherein said moving means cause said reproducing means to effect a backward jump over two fields after every fourth, every sixth and every eighth field is read and a forward jump over two fields after every fifth and every seventh field is read during every cycle of four consecutive film frames.

8. A system as claimed in claim 1, wherein at least the video fields to be repeated in conformity with said pattern are provided with at least two sound channels, one of said sound channels being reproduced during the first reproduction of said field and the other sound channel being reproduced during the second reproduction of said field.

9. A record carrier comprising a plurality of circular track portions defining turns of a spiral information track in which a programme of consecutive film frames intended to be viewed at a rate of n film frames per second has been recorded as a video signal so that each of said circular track portions contains only two consecutive video fields of said video signals, the nominal playback speed of the record carrier being m video pictures of two fields per second, wherein m>n.

10. A system for playing back a film recorded as a video signal on a disc-shaped record carrier, said film being comprised of consecutive film frames which are intended to be viewed at a first rate of a first predetermined number of film frames per second whereas video fields of said video signal are intended to be displayed at a second rate of a second predetermined number of video fields per second, said second rate being greater than said first rate, said video signal being recorded in a plurality of circular, optically detectable tracks which define concentric circles or turns of a spiral on said record carrier, each frame of said film being recorded as two consecutive video fields in a single circular track so that when a given circular track is read during playback, two consecutive video fields representing one film frame are reproduced during one revolution of said record carrier, said system comprising means for rotating said record carrier, means for projecting a light beam onto said record carrier so as to scan said tracks upon rotation of said record carrier, means for extracting said video signal recorded in said tracks from light coming from said record carrier, means for moving said beam relative to said record carrier in a radial direction so as to enable said beam to jump from a track being read to an adjacent track or to the beginning of the track that has been read, and means for actuating said beam moving means so as to cause said beam to scan said tracks in predetermined pattern such that said film frames are reproduced at said first rate and said video fields are reproduced at said second rate by causing said beam to scan some tracks containing said two consecutive video fields once so that some of said frames of said film are represented in said extracted video signal by two video fields and causing said beam to scan other track portions containing a given video field twice so that other film frames are represented in said extracted video signal by more than two video fields so that upon display of video picture represented by said video signal, said frames of said film are displayed at said intended first rate and said video fields are displayed at said second rate.

11. A system as claimed in claim 10 wherein said actuating means is responsive to said extracted video signal.

12. A system as claimed in claim 11 wherein said actuating means includes means for counting video fields in said extracted video signal and means responsive to said counting means for generating a jump signal in response to which said moving means moves said beam, after said beam scans a track portion containing one of two consecutive video fields associated with a given film frame, to an adjacent track containing a video field associated with the next film frame which follows said given film frame or to the beginning of the track being scanned so as to scan the track portion containing the other of said two consecutive video fields associated with said given film frame.

* * * * *